US006633643B1

(12) United States Patent  
Ona

(10) Patent No.: US 6,633,643 B1
(45) Date of Patent: Oct. 14, 2003

(54) HINGE STRUCTURE FOR COLLAPSIBLE PORTABLE PHONE

(75) Inventor: Masaaki Ona, Kawagoe (JP)

(73) Assignee: Kabushiki Kaisha Strawberry Corporation, Saitama-ken (JP)

( * ) Notice: Subject to any disclaimer, the term of this patent is extended or adjusted under 35 U.S.C. 154(b) by 479 days.

(21) Appl. No.: 09/659,457

(22) Filed: Sep. 11, 2000

(30) Foreign Application Priority Data

Oct. 15, 1999 (JP) ........................................... 11-293557
Nov. 29, 1999 (JP) ........................................... 11-337682

(51) Int. Cl.$^7$ ............................................... H04M 1/00
(52) U.S. Cl. ............................................. 379/433.13
(58) Field of Search ................... 379/433.13; 455/90; 16/330, 334, 329, 325

(56) References Cited

U.S. PATENT DOCUMENTS 5,937,062 A  *  8/1999  Sun et al. .............. 379/433.13
6,141,831 A  *  11/2000 Novin et al. ........... 379/433.13

* cited by examiner

Primary Examiner—Jack Chiang
(74) Attorney, Agent, or Firm—Sughrue Mion, PLLC

(57) ABSTRACT

To provide a novel hinge structure for a collapsible portable phone, which is very convenient and highly valuable on the market, the hinge structure includes an operating member (2) provided with a phone operating portion (1) on its surface; a display member (3), pivotally and collapsibly coupled with the operating member (2) and provided with a display image field (6) in which numerals and/or letters for phone numbers and/or names may be displayed on its surface; and a biasing mechanism S that may exhibit a closing biasing force for biasing the display member (3) in a closing direction between a closed condition that the display member (3) is collapsed to the operating member (2) and a predetermined rotational position A where the display member (3) is rotated to the operating member (2) in an opening direction and may exhibit an opening biasing force for biasing the display member (3) in the opening direction between a fully opened condition that the display member (3) is fully opened to the operating member (2) and a predetermined rotational position B where the display member (3) is rotated in the closing direction. The biasing mechanism S is provided at a pivot portion (4) between the operating member (2) and the display member (3).

7 Claims, 6 Drawing Sheets

HINGE STRUCTURE FOR COLLAPSIBLE PORTABLE PHONE

BACKGROUND OF THE INVENTION

The present invention relates to a hinge structure for a collapsible portable phone.

Recently, a variety of kinds and a variety of specifications of portable phones have been proposed in order to meet the consumers' needs under the circumstances that portable phones have been used more and more.

Under such circumstances, there has been proposed a collapsible portable phone composed of an operating body provided with a phone operating portion on its surface and a display body pivotally and collapsibly coupled with the operating body and provided with a liquid crystal display image field that may display Arabic numerals or letters such as names or phone numbers on its surface. Not only may this type portable phone be collapsed to be superior in portability and a malfunction of the phone operating portion may be prevented when the phone operating portion is protected or concealed in the case where the portable phone is put into a pocket in the collapsed condition. On the other hand, this structure has an advantage that the user may enjoy the conversation comfortably because the overall length is elongated when opened. In some cases, the user would feel uncomfortable unless a microphone portion is close to his or her mouth.

SUMMARY OF THE INVENTION

The present inventors have paid his attention to this type collapsible portable phone and have invented a hinge structure for a novel collapsible portable phone that is extremely convenient in use, extremely high in commercial applicability, and may cultivate or motivate the consumers' heart to buy.

In order to attain this and other objects of the present invention, there is provided a hinge structure for a collapsible portable phone, comprising: an operating member provided with a phone operating portion on its surface; a display member, pivotally and collapsibly coupled with the operating member and provided with a display image field in which numerals and/or letters for phone numbers and/or names may be displayed on its surface; and a biasing mechanism that may exhibit a closing biasing force for biasing the display member in a closing direction between a closed condition that the display member is collapsed to the operating member and a predetermined rotational position where the display member is rotated to the operating member in an opening direction and may exhibit an opening biasing force for biasing the display member in the opening direction between a fully opened condition that the display member is fully opened to the operating member and a predetermined rotational position where the display member is rotated in the closing direction, the biasing mechanism being provided at a pivot portion between the operating member and the display member, wherein a rotary shaft coupled with the operating member is provided, a bearing member provided with a recess portion that may be engaged in a convex/concave engagement manner with an elongate projection provided in the rotary shaft is coupled with the display member, the elongate projection provided on the rotary shat and the recess portion provided in the bearing member are liable to engage with each other from a disengaged condition, when the rotary shaft is rotated relative to the bearing member about an axis, so that a rotational biasing force is generated between the rotary shaft and the bearing member for rotating the rotary shaft, the rotational biasing force is set so that the elongate projection provided in the rotary shaft and the recess portion provided in the bearing member are disengaged away from each other so that the rotational biasing force does not work when the display member is being rotated to the operating member between the predetermined rotational positions, and the rotational biasing force is set so that the elongate projection provided on the rotary shaft and the recess portion provided in the bearing member are liable to engage with each other so that the display member is rotated from the collapsed condition relative to the operating member up to the predetermined rotational position where the display member is rotated in the opening direction and from the opened condition that the display member is fully opened to the operating member to the predetermined rotational position that the display member is rotated in the closing direction to thereby work as the closing biasing force and the opening biasing force.

Also, according to a second aspect of the invention, there is provided a hinge structure for a collapsible portable phone, comprising: an operating member provided with a phone operating portion on its surface; a display member, pivotally and collapsibly coupled with the operating member and provided with a display image field in which numerals and/or letters for phone numbers and/or names may be displayed on its surface; and a biasing mechanism that may exhibit a closing biasing force for biasing the display member in a closing direction between a closed condition that the display member is collapsed to the operating member and a predetermined rotational position where the display member is rotated to the operating member in an opening direction and may exhibit an opening biasing force for biasing the display member in the opening direction between a fully opened condition that the display member is fully opened to the operating member and a predetermined rotational position where the display member is rotated in the closing direction, the biasing mechanism being provided at a pivot portion between the operating member and the display member, wherein a rotary shaft coupled with the operating member is provided, a bearing member provided with an elongate projection that may be engaged in a convex/concave engagement manner with a recess portion provided in the rotary shaft is coupled with the display member, the recess portion provided on the rotary shat and the elongated projection provided in the bearing member are liable to engage with each other from a disengaged condition, when the rotary shaft is rotated relative to the bearing member about an axis, so that a rotational biasing force is generated between the rotary shaft and the bearing member for rotating the rotary shaft, the rotational biasing force is set so that the recess portion provided in the rotary shaft and the elongate projection provided in the bearing member are disengaged away from each other so that the rotational biasing force does not work when the display member is being rotated to the operating member between the predetermined rotational positions, and the rotational biasing force is set so that the recess portion provided on the rotary shaft and the elongate projection provided in the bearing member are liable to engage with each other so that the display member is rotated from the collapsed condition relative to the operating member up to the predetermined rotational position where the display member is rotated in the opening direction and from the opened condition that the display member is fully opened to the operating member to the predetermined rotational position that the display member is rotated in the closing direction to thereby work as the closing biasing force and the opening biasing force.

According to a third aspect of the invention, there is provided a hinge structure for a collapsible portable phone, comprising: an operating member provided with a phone operating portion on its surface; a display member, pivotally and collapsibly coupled with the operating member and provided with a display image field in which numerals and/or letters for phone numbers and/or names may be displayed on its surface; and a biasing mechanism that may exhibit a closing biasing force for biasing the display member in a closing direction between a closed condition that the display member is collapsed to the operating member and a predetermined rotational position where the display member is rotated to the operating member in an opening direction and may exhibit an opening biasing force for biasing the display member in the opening direction between a fully opened condition that the display member is fully opened to the operating member and a predetermined rotational position where the display member is rotated in the closing direction, the biasing mechanism being provided at a pivot portion between the operating member and the display member, wherein a rotary shaft coupled with the display member is provided, a bearing member provided with a recess portion that may be engaged in a convex/concave engagement manner with an elongate projection provided in the rotary shaft is coupled with the operating member, the elongate projection provided on the rotary shat and the recess portion provided in the bearing member are liable to engage with each other from a disengaged condition, when the rotary shaft is rotated relative to the bearing member about an axis, so that a rotational biasing force is generated between the rotary shaft and the bearing member for rotating the rotary shaft, the rotational biasing force is set so that the elongate projection provided in the rotary shaft and the recess portion provided in the bearing member are disengaged away from each other so that the rotational biasing force does not work when the display member is being rotated to the operating member between the predetermined rotational positions, and the rotational biasing force is set so that the elongate projection provided on the rotary shaft and the recess portion provided in the bearing member are liable to engage with each other so that the display member is rotated from the collapsed condition relative to the operating member up to the predetermined rotational position where the display member is rotated in the opening direction and from the opened condition that the display member is fully opened to the operating member to the predetermined rotational position that the display member is rotated in the closing direction to thereby work as the closing biasing force and the opening biasing force.

According to a fourth aspect of the invention, there is provided a hinge structure for a collapsible portable phone, comprising: an operating member provided with a phone operating portion on its surface; a display member, pivotally and collapsibly coupled with the operating member and provided with a display image field in which numerals and/or letters for phone numbers and/or names may be displayed on its surface; and a biasing mechanism that may exhibit a closing biasing force for biasing the display member in a closing direction between a closed condition that the display member is collapsed to the operating member and a predetermined rotational position where the display member is rotated to the operating member in an opening direction and may exhibit an opening biasing force for biasing the display member in the opening direction between a fully opened condition that the display member is fully opened to the operating member and a predetermined rotational position where the display member is rotated in the closing direction, the biasing mechanism being provided at a pivot portion between the operating member and the display member, wherein a rotary shaft coupled with the display member is provided, a bearing member provided with an elongate projection that may be engaged in a convex/concave engagement manner with a recess portion provided in the rotary shaft is coupled with the operating member, the recess portion provided on the rotary shat and the elongated projection provided in the bearing member are liable to engage with each other from a disengaged condition, when the rotary shaft is rotated relative to the bearing member about an axis, so that a rotational biasing force is generated between the rotary shaft and the bearing member for rotating the rotary shaft, the rotational biasing force is set so that the recess portion provided in the rotary shaft and the elongate projection provided in the bearing member are disengaged away from each other so that the rotational biasing force does not work when the display member is being rotated to the operating member between the predetermined rotational positions, and the rotational biasing force is set so that the recess portion provided on the rotary shaft and the elongate projection provided in the bearing member are liable to engage with each other so that the display member is rotated from the collapsed condition relative to the operating member up to the predetermined rotational position where the display member is rotated in the opening direction and from the opened condition that the display member is fully opened to the operating member to the predetermined rotational position that the display member is rotated in the closing direction to thereby work as the closing biasing force and the opening biasing force.

In the structure according to any one of the first to fourth aspects of the invention, according to a fifth aspect of the invention, it is preferable that a biasing member for depressing and biasing the bearing member to the rotary shaft is provided, and the depressing and biasing force of the biasing member causes a damping effect due to a contact resistance between the rotary shaft and the bearing member when the display member is rotated relative to the operating member between the predetermined rotational positions to serve as a holding force for holding the opened condition of the display member to the operating member.

In the structure according to any one of the first to fourth aspects of the invention, it is preferable that an engagement portion that engages with the bearing member in the rotary shaft and the bearing member are made of suitable synthetic resin.

Also, in the structure according to the fifth aspect of the invention, it is preferable that an engagement portion that engages with the bearing member in the rotary shaft and the bearing member are made of suitable synthetic resin The embodiments of the present invention will now be summarized.

According to the present invention, for instance, the display member is rotated in the opening direction until the display member is biased by the opening biasing force of the biasing mechanism up to the maximum opening state when the display member is rotated in the opening direction up to a predetermined rotational position from the collapsed condition. In this case, since the opening biasing force of the biasing mechanism is applied always to the display member, for instance, there is no fear that the display member is accidentally closed when the user enjoys the conversation, and the opened condition of the display member may be held always.

Also, when the display member is rotated in the closing direction to the operating member to the predetermined position A from the fully opened condition, the display member is biased by the closing biasing force of the biasing mechanism and rotated in the closing direction to the closed condition. In this case, since the closing biasing force of the biasing mechanism is always applied to the display member, for instance, there is no fear that the display member is accidentally opened, and the display member is always kept under the closed condition.

Accordingly, when the display member is opened to the operating member, it is possible to hold the opened condition without fail, and when the display member is closed to the operating member, it is possible to hold the closed condition without fail. Accordingly, it is possible to provide a handy phone that is very convenient and easy to use.

Also, in the embodiment, the rotational biasing force of the biasing mechanism S, which will become the closing biasing force for biasing the display member to the operating member in the closing direction and the opening biasing force for biasing the display member to the operating member in the opening direction, is composed of a force for engaging the recess portion or the elongate portion provided in the rotary shaft with the elongate portion or the recess portion provided in the bearing member from the disengaged condition. Accordingly, even with a miniaturized size, it is possible to exhibit the good rotational biasing force without fail, and hence it is possible to attain the miniaturization and reduction of weight of the portable phone as a whole.

Namely, in the case where the a semi-spherical convex portion and a semi-spherical concave portion are provided to the rotational shaft and the bearing member so as to generate the rotational biasing force, the contact between the convex portion and the concave portion is a point contact. Accordingly, it is necessary to provide the contact between the convex portion and the concave portion away from the axis of the rotary shaft by increasing the size of the projection (the diameter) or the like in order to obtain the sufficient biasing force by the cam effect. As a result the hinge portion provided with the biasing mechanism composed of this rotary shaft and the bearing member is enlarged in size, and hence, the weight of the portable phone as a whole is increased and the size thereof is also enlarged. In this connection, according to the present invention, the contact between the recess portion and the elongate portion of the rotary shaft and the bearing member is the line contact (or the area contact). Accordingly, it is possible to obtain the wide surface area even with the small size projection and to exhibit the sufficient rotational biasing force even if the projection is provided in the vicinity of the axis of the rotary shaft. It is therefore possible to make very compact the hinge portion provided with the biasing mechanism composed of the rotary shaft and the bearing member. Thus, it goes without saying that it is possible to produce the phones in low cost in a mass-production fashion. In addition, it is possible to attain the miniaturization and the reduction in weight of the portable phones as a whole.

Also, according to the second aspect of the invention, because of the simple structure, it goes without saying that it is possible to provide the portable phones in low cost in excellent productivity. In addition, it is possible to provide the collapsible portable phones that are easy to use.

Also, according to the third aspect of the invention, it goes without saying that it is possible to provide the portable phones in low cost in excellent productivity. In addition, it is possible to attain the miniaturization and reduction in weight of the portable phones as a whole in a more effective way.

DESCRIPTION OF THE PREFERRED EMBODIMENTS

Figure 1:
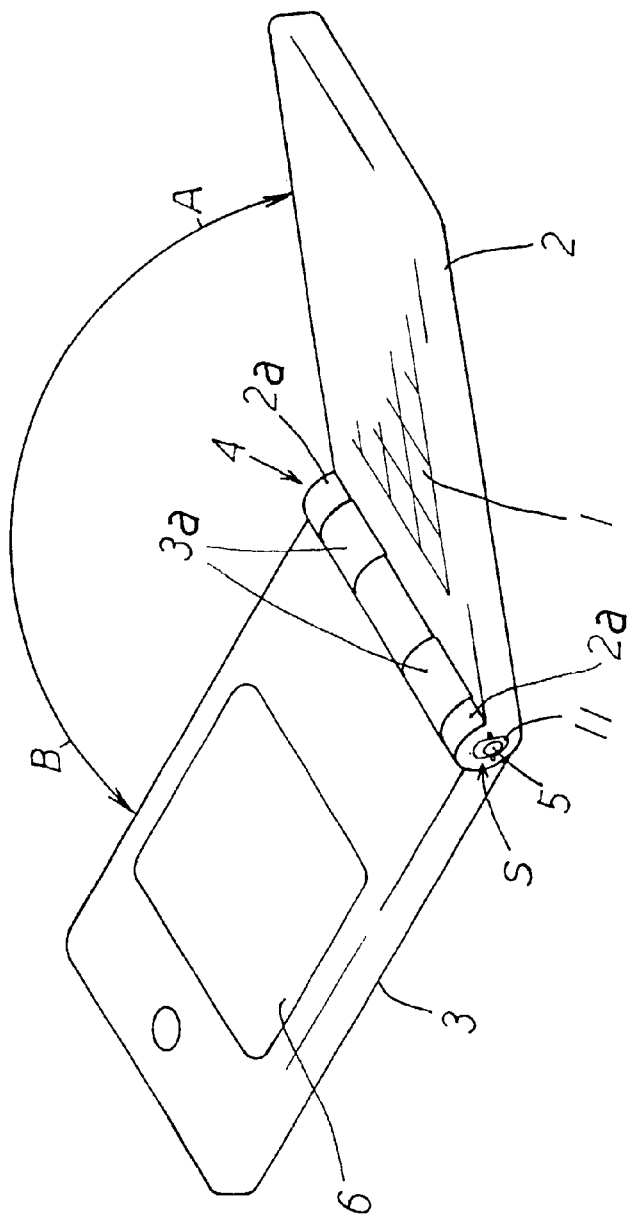
FIG. 1 is a schematic view showing an operation of a handy phone according to an embodiment of the invention.

The accompanied drawings show an embodiment of the present invention which will now be described.

In this embodiment, a collapsible portable phone is composed of an operating member 2 provided at its surface with a phone operating portion 1, and a display member 3 pivotally and collapsibly mounted on the operating member 2 and provided with a display surface 6 that may display Arabic numerals or letters such as phone numbers or names on its surface. A biasing mechanism S is interposed in a hinge portion 4 between the operating member 2 and the display member 3, which biasing mechanism may exhibit a closing biasing force for biasing the display member 3 in a closing direction between a closed condition in which the display member 3 is collapsed relative to the operating member 2 and a predetermined angular position A in which the display member 3 is angularly moved in an opening direction, and may exhibit an opening biasing force for biasing the display member 3 in an opening direction between the opened condition in which the display member 3 is fully opened relative to the operating member 2 and a predetermined angular position B in which the display member 3 is angularly moved in the closing direction.

The biasing mechanism S according to this embodiment will now be described.

The biasing mechanism S is composed of a biasing member 11 composed of a rotary shaft 5 and a bearing member 7 formed together with the rotary member 5.

Figure 2:
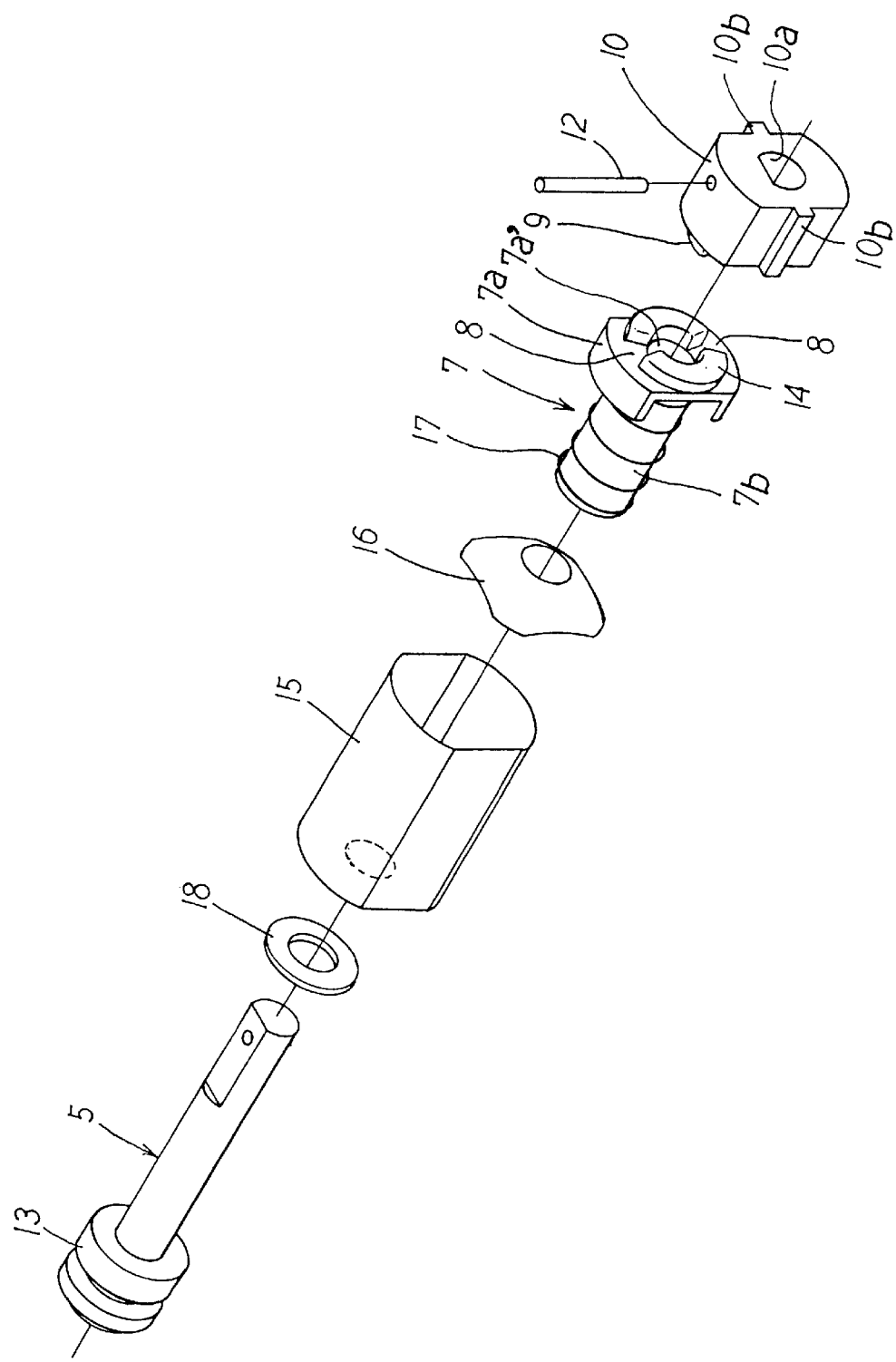
FIG. 2 is an exploded perspective view showing a hinge structure according to the embodiment of the invention.
Figure 3:
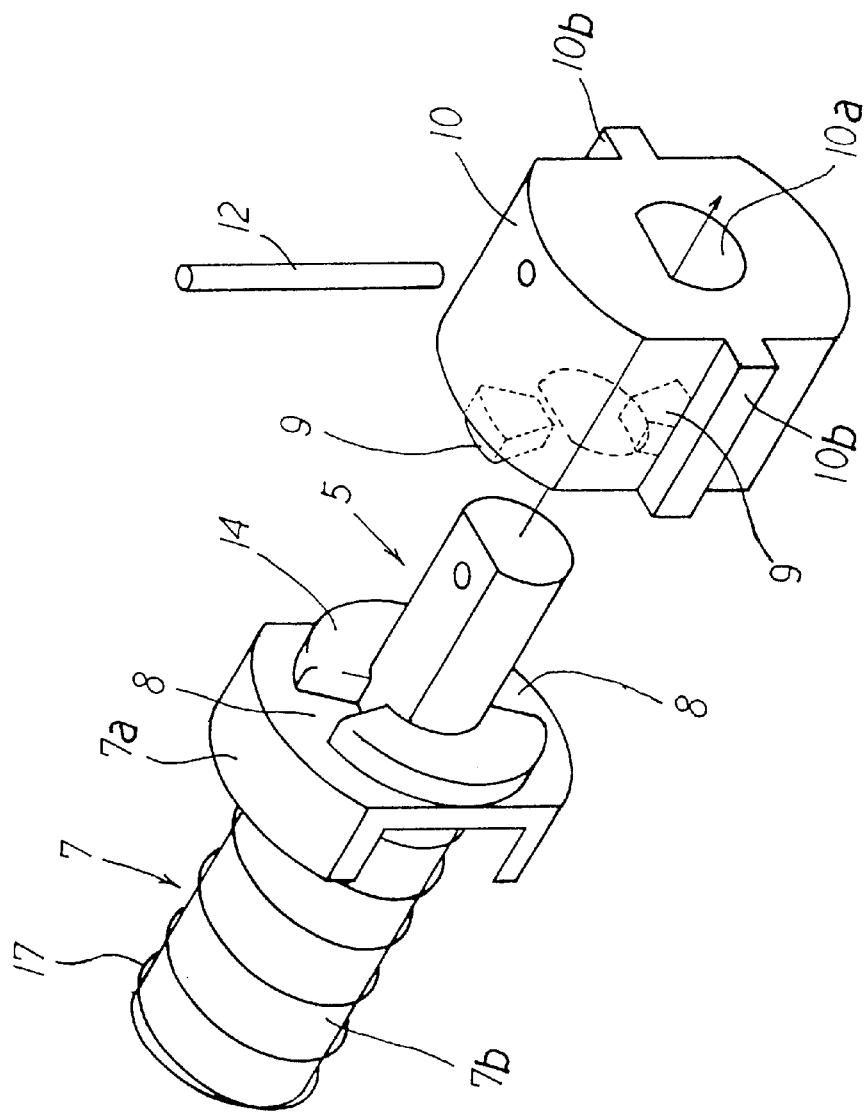
FIG. 3 is an exploded perspective view showing a primary part of the hinge structure according to the embodiment of the invention.
Figure 4D:
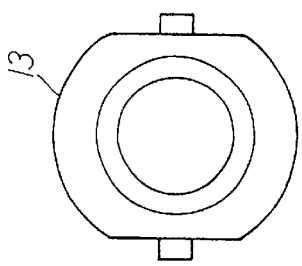
FIGS. 4A to 4E are schematic illustrations of the primary part of the hinge structure according to the embodiment of the invention.
Figure 4A:
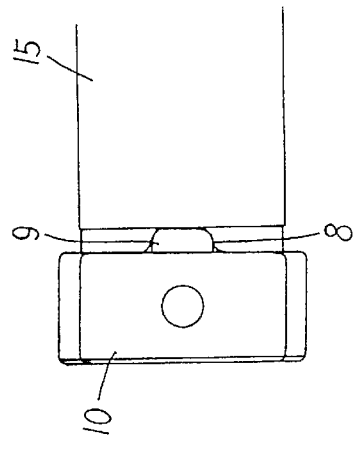
Figure 4C:
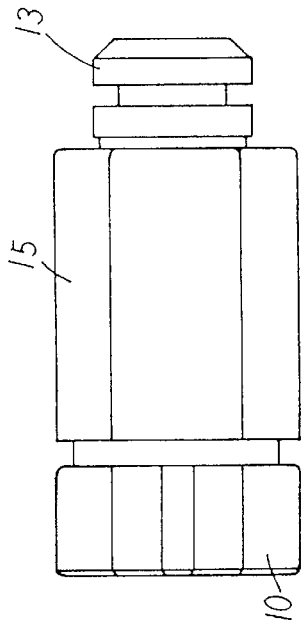
Figure 4E:
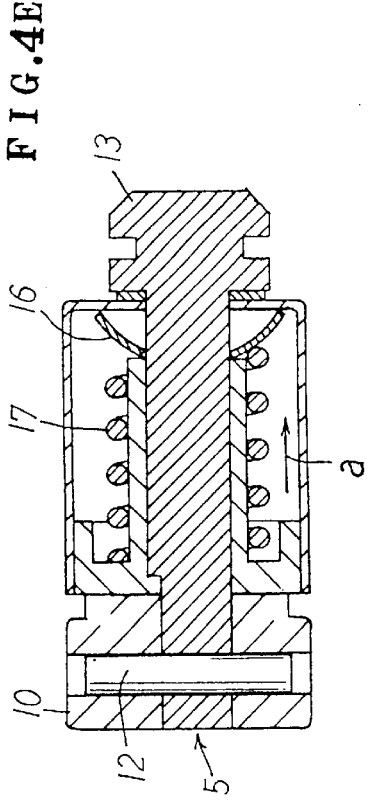
Figure 4B:
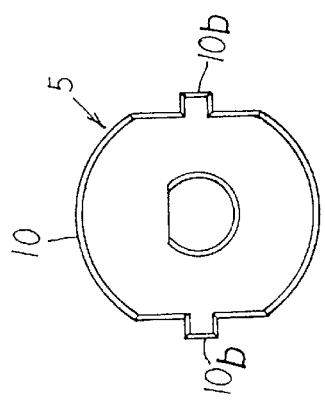

As shown in FIGS. 2 to 4, the rotary shaft 5 of the biasing member 11 is formed of a rod-like member made of suitable metal. This rotary shaft 5 is fitted in a ring member 10 made of suitable synthetic resin at its end portion in a rotation-preventing manner through a retainer pin 12.

A pair of elongated projections 9 are formed radially in a position, facing an opening of a through-hole 10a through which the rotary shaft 5 passes, of the inner surface of this ring member 10. Incidentally, in some cases, a member obtained by pressing a member made of suitable metal or by die-casting may be used as the ring member 10. In particular, the latter is extremely superior in durability. This has been confirmed experimentally by the present applicant.

The elongate projections 9 are formed so as to fit elongate recesses 8 formed in the bearing member 7 to be described later in detail. Each corner portion forming the elongate projections 9 are rounded or beveled.

Also, elongate projections 10b are formed on right and left side wall cut into flat surfaces for the circumferential surfaces of the ring member 10. The elongate projections 10b are used to couple the rotary shaft 5 with the operating member 2 or the display member 3 in a rotation preventing manner. This ring member 10 may also be referred to as an engagement portion of the rotary shaft 5.

Also, a circumferential flange 13 is formed at a proximal end portion of the rotary shaft 5. This circumferential flange 13 is used to couple the rotary shaft 5 to be rotatable relative to a receptacle 15 for receiving the bearing member 7 to be described later in detail.

As shown in FIGS. 2 to 4, the bearing member 7 is formed of a member made of suitable synthetic resin. When the bearing member 7 is received in the receptacle 15 to be described later in detail, the bearing member 7 is composed of a bearing portion 7a having a substantially square shape as viewed from the front side so as to be fit in a rotation preventing fashion and a cylindrical portion 7b formed integrally with the bearing portion 7a and that may fit in the rotary shaft 5. Incidentally, in some cases, one obtained by die-casting or one obtained by pressing a member made of suitable metal may be used as the bearing member 7 in conformity with the above-described ring member 10. In particular, the latter is extremely superior in durability. This has been confirmed experimentally by the present applicant.

Also, an axial hole 7a' is formed in the bearing portion 7a. This axial hole 7a' is formed so that the rotary shaft 5 may pass through the axial hole 7a'.

A pair of annular projections 14 are formed on an opening circumferential edge of the tip end face of the axial hole 7a' of the bearing portion 7a. The annular projections 14 define the pair of recess portions 8 by being cut at two diametrically opposite positions.

The recess portions 8 are formed so as to be fitted with the elongate projections 9 formed on the ring member 7a engaged with the rotary shaft 5 when the bearing member 7 and the rotary shaft 5 are coupled with each other. Each corner portion forming the recess portions 8 are rounded or beveled.

Also, the bearing member 7 is received in the receptacle 15 made of metal and having a substantially square-shape as viewed from the front side. The bearing member 7 is coupled with the rotary member 5 to form the above-described biasing member 11.

More specifically, as shown in FIGS. 2 and 4, a leaf spring 16 is disposed within the receptacle 15, and a coiled spring 17 is fitted around the cylindrical portion 7b of the bearing member 7. Subsequently, under this condition, the rotary shaft 5 is caused to pass through the receptacle 15 and the bearing member 7 via a washer 18. Subsequently, the ring member 10 is fitted and coupled at the tip end portion of the rotary shaft 5. In this case, the rotary shaft 5 is rotatable relative to the bearing member 7 and the receptacle 15. The bearing member 7 is movable in the axial direction (direction indicated by character a in FIG. 4E) against the leaf spring 16 and the coiled spring 17 within the receptacle 15 in a rotation preventing manner. Accordingly, when the rotary shaft 5 is rotated around the axis, the recess portions 8 of the bearing member 7 and the elongate projections 9 of the rotary shaft 5 are rotated around the axis while kept from the engaged condition to the disengaged condition or the disengaged condition to the engaged condition alternatively.

When the rotary shaft 5 is rotated by about half a turn (180° rotation), the thus constructed biasing member 11 is constructed so that the condition where the rotary shaft 5 and the bearing member 7 are disengaged from each other is likely to come to the condition where these components are engaged with each other, whereby a rotational biasing force for forcibly rotating the rotary shaft 5 is generated twice.

The explanation of this rotational biasing force will now be described more specifically referring to the schematic operational views of FIGS. 5 to 8.

Figure 5:
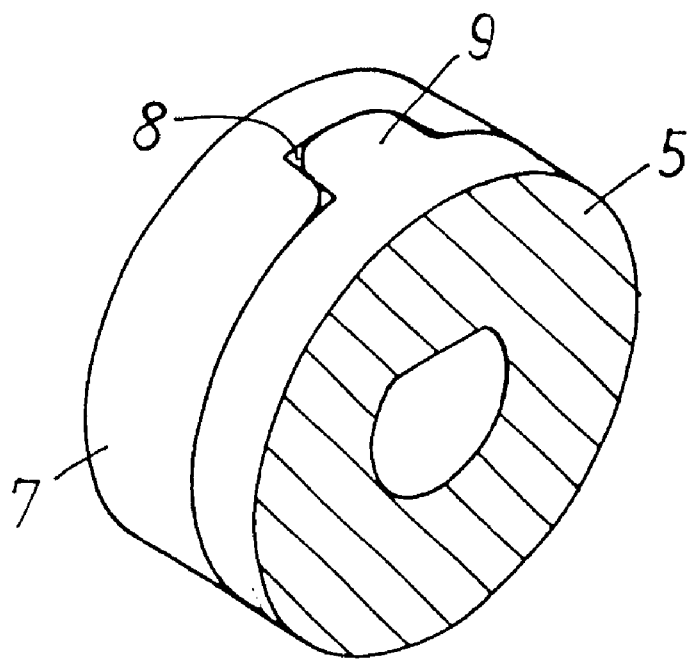
FIG. 5 is a schematic illustration of the operation of the primary part of the hinge structure according to embodiment of the invention.
Figure 6:
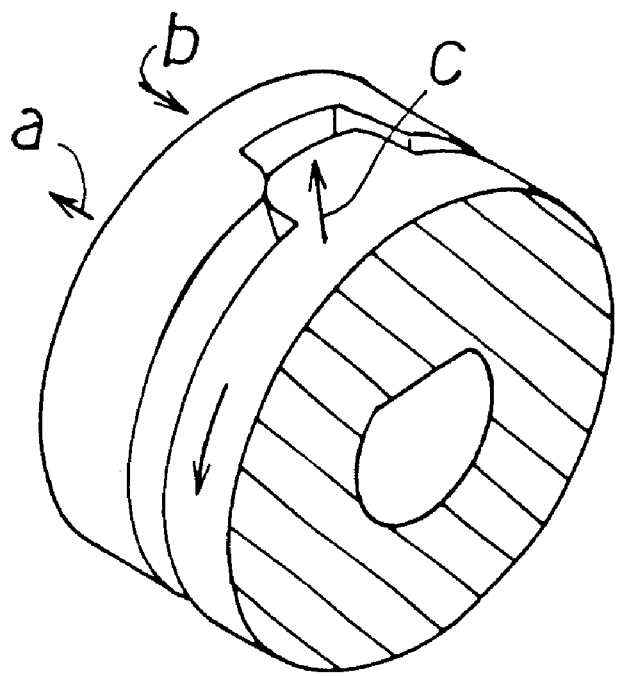
FIG. 6 is a schematic illustration of the operation of the primary part of the hinge structure according to embodiment of the invention.

First of all, as shown in FIG. 5, when the rotary shaft 5 is rotated around the axis from the condition that the elongate projections 9 provided in the rotary shaft 5 and the recess portions 8 provided in the bearing member 7 are engaged with each other, the bearing member 7 is moved in the direction indicated by character a in FIG. 6 against the depression biasing force of the leaf spring 16 and the coiled spring 17 within the receptacle 15 by the force for urging the elongate projections 9 of the rotary shaft 5 to be slid and disengaged away from the recess portions 8 of the bearing member 7. As a result, the elongate projections 9 of the rotary shaft 5 is disengaged from the recess portion 8 of the bearing member 7. In this case, the elongate projections 9 are likely to be slid in a direction indicated by an arrow c in FIG. 6 and engaged with the recess portions 8 from the condition that the elongate projections 9 are disengaged from the recess portions 8 by a contact relationship between the rounded surfaces of the elongate projections 9 and the recess portions 8 and the depression biasing force of the leaf spring 16 and the coiled spring 17, so that a first rotational biasing force is effected in the rotary shaft 5.

Figure 7:
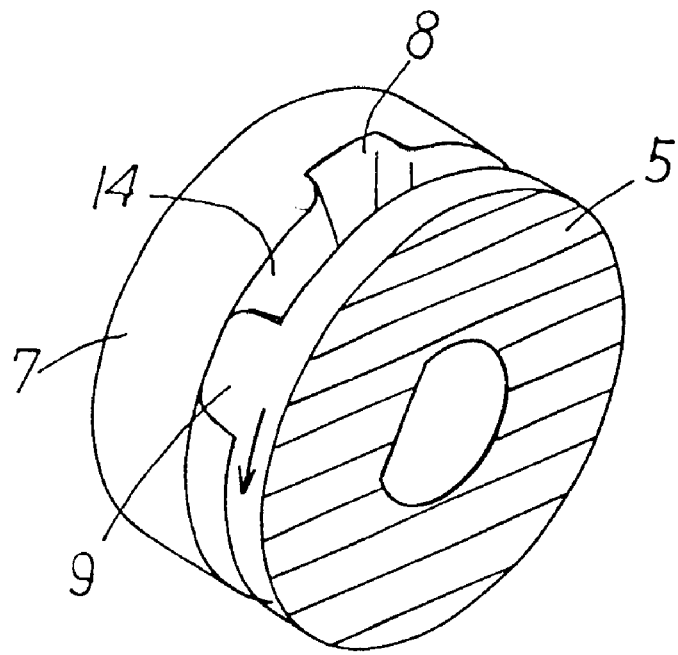
FIG. 7 is a schematic illustration of the operation of the primary part of the hinge structure according to embodiment of the invention.
Figure 8:
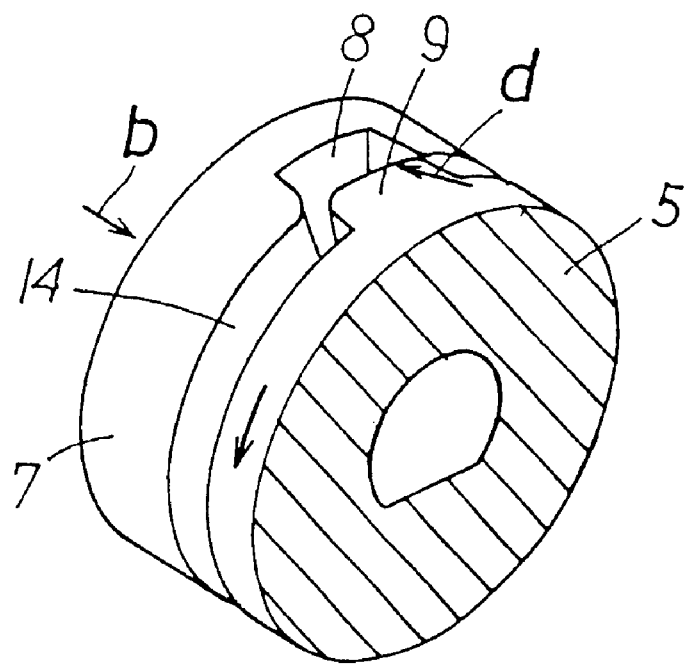
FIG. 8 is a schematic illustration of the operation of the primary part of the hinge structure according to embodiment of the invention.

Subsequently, thereafter the elongate projections 9 of the rotary shaft 5 are completely disengaged away from the recess portions 8 of the bearing member 7. When the rotary shaft 5 is rotated through about half a turn (180° rotation), as shown in FIG. 7, the elongate projections 9 rotate while sliding on the end face of the annular projections 14 of the bearing member 7. In this case, a damping effect is generated by the contact resistance of the depression biasing force of the leaf spring 16 and the coiled spring 17 between the end faces of the annular projections 14 and the end faces of the elongate projections 9. Then, as shown in FIG. 8, when the elongate projections 9 are again close to the recess portions 8, in the same manner as described above, the elongate projections 9 are likely to be slid in a direction indicated by an arrow d in FIG. 8 and engaged with the recess portions 8 from the condition that the elongate projections 9 are disengaged from the recess portions 8 by a contact relationship between the rounded surfaces of the elongate projections 9 and the recess portions 8 and the depression biasing force of the leaf spring 16 and the coiled spring 17, so that a second rotational biasing force is effected in the rotary shaft 5. Incidentally, in this embodiment, the elongate projections 9 are provided on the rotary shaft 5 and the recess portions 8 are provided in the bearing member 7. However, it is possible to provide the elongate projections 9 to the bearing member 7 and to provide the recess portion 8 to the rotary shaft 5.

In the biasing member 11 according to this embodiment, the respective ring members 10 of the shaft 5 are fitted in the rotation preventing condition with installation portions 2a provided at right and left positions on the tip end sides of the operating member 2, whereas the respective receptacles 15 receiving the bearing members 7 are fitted in the rotation preventing condition with installation portions 3a provided at right and left positions on the proximal end side of the display member 3. Accordingly, the display member 3 is pivoted to the operating member 2 through the biasing member 11. Incidentally, it is possible to provide the rotary shaft 5 to the display member 3 and to provide the bearing member 7 to the operating member 2.

In this case, in this embodiment, one of the rotational biasing forces generated whenever the rotary shaft 5 is rotated around the axis by 180° is applied as the closing biasing force for biasing the display member 3 in the closing direction, and the other is applied as the opening biasing force for biasing the display member 3 in the opening direction.

Namely, as described above, the biasing mechanism may exhibit a closing biasing force for biasing the display member 3 in a closing direction between a closed condition in which the display member 3 is collapsed relative to the operating member 2 and a predetermined angular position A in which the display member 3 is angularly moved in an opening direction, and may exhibit an opening biasing force for biasing the display member 3 in an opening direction between the opened condition in which the display member 3 is fully opened relative to the operating member 2 and a predetermined angular position B in which the display member 3 is angularly moved in the closing direction.

Accordingly, when the display member 3 is kept in the collapsed condition, the closing biasing force is applied so as to prevent the display member 3 from being opened accidentally, and on the other hand, when the display member 3 is kept in the fully opened condition, the opening biasing force is applied so as to prevent the display member 3 from being closed in case of, for example, conversation.

In this embodiment, the elongate projections 9 provided on the rotary shaft 5 and the recess portions 8 provided in the bearing member 7 are set so as to be disengaged from each other so that any rotational biasing force is not applied and the end faces of the annular projections 14 of the bearing member 7 are always depressed against the elongate projections 9 of the rotary shaft 5 by the leaf spring 16 and the coiled spring 17 used as the biasing members when the display member 3 is rotated relative to the above-described operating member 2 between the above-described predetermined rotational position A and the above-described predetermined rotational position B. Accordingly, when the display member 3 is rotated relative to the above-described operating member 2 between the above-described predetermined rotational position A and the above-described predetermined rotational position B, the damping effect is caused by the contact resistance is generated, so that the depression biasing force of the leaf spring 16 and the coiled spring 17 is used as the holding force for holding the opened condition of the display member 3 relative to the operating member 2. Accordingly, the display member 3 is held in the stop condition (slanted condition) at a desired position relative to the operating member 2 by the above-described damping effect when the display member 3 is rotated between this predetermined rotational position A and the above-described predetermined rotational position B.

Also, in this embodiment, when the biasing member 11 is assembled with the hinge portion 4 between the operating member 2 and the display member 3, the rotational biasing force (closing biasing force) of the biasing mechanism S further works in the closing direction even in the collapsed closed condition of the display member 3 to the operating member 2.

Namely, the present embodiment is set so that the opened condition (condition shown in FIG. 1) where the display member 3 is fully opened is obtained when the display member 3 is rotated by about 150° to 160° relative to the operating member 2. Accordingly, when the biasing member 11 is assembled with the hinge portion 4, the components are assembled so that the rotational biasing force is left in a predetermined range such that the closing biasing force is further applied even if the display member 3 is kept in the collapsed closed condition relative to the operating member 2 out of the range where the rotational biasing force generated by rotating the rotary shaft 5 about the axis is applied. Namely, when the display member 3 is kept in the collapsed closed condition relative to the operating member 2, the elongate projections 9 of the rotary shaft 5 are stopped while the rotational biasing force is applied thereto under the condition that the elongate projection 9 are not completely engaged with the recess portions 8 of the bearing member 7. Accordingly, even when the display member 3 is kept in the collapsed closed condition relative to the operating member 2, it should be noted that the closing biasing force for rotating the display member 3 in the closing direction is further applied to the display member 3.

With such a structure according to the above-described embodiment, for instance, when the display member 3 is rotated in the opening direction from the collapsed closed condition to the predetermined rotational position B relative to the operating member 2, the display member 3 is biased by the opening biasing force of the biasing mechanism S and rotated in the opening direction until it is fully opened. In this case, since the opening biasing force of the biasing mechanism S is always applied to the display member 3. Accordingly, there is no trouble such as a case, for example, where the display member 3 is closed when the user enjoys his or her conversation and so on. The display member 3 is always kept in the opened condition.

Also, when the display member 3 is rotated in the closing direction from the fully opened condition of the display member 3 to the predetermined rotational position A relative to the operating member 2, the display member 3 is biased by the closing biasing force of the biasing mechanism S and rotated in the closing direction until it is fully closed. In this case, since the closing biasing force of the biasing mechanism S is always applied to the display member 3. Accordingly, there is no trouble such as a case, for example, where the display member 3 is opened accidentally. The display member 3 is always kept in the closed condition.

Accordingly, in the embodiment, it is possible to hold the opened condition without fail when the display member 3 is opened relative to the operating member 2, and to hold the closed condition without fail when the display member 3 is closed relative to the operating member 2. Thus, it is possible to provide a portable phone that is very convenient to use.

Also, in the embodiment, the rotational biasing force of the biasing mechanism S, which will become the closing biasing force for biasing the display member 3 to the operating member 2 in the closing direction and the opening biasing force for biasing the display member 3 to the operating member 2 in the opening direction, is composed of a force for engaging the recess portion 8 or the elongate portion 9 provided in the rotary shaft 5 with the elongate portion 9 or the recess portion 8 provided in the bearing member 7 from the disengaged condition. Accordingly, even with a miniaturized size, it is possible to exhibit the good rotational biasing force without fail, and hence it is possible to attain the miniaturization and reduction of weight of the portable phone as a whole.

Also, in the embodiment, the leaf spring 16 (coiled spring 17) for depressingly biasing the bearing member 7 to the rotary shaft 5 is provided so that the depression biasing force of this leaf spring 16 (coiled spring 17) causes a damping effect by the contact resistance between the rotary shaft 5 and the bearing member 7 when the display member 3 is rotated to the operating member 2 between the predetermined rotational position A and the predetermined rotational position B and is served as a holding force for holding the opened condition of the display member 3 to the operating member 2. It goes without saying that it is easy to simplify the structure in low cost with a high mass-productivity. In addition, it is possible to hold the slanted condition as desired by the user (for example, the condition that the user is comfortable for conversation) without fail. It is thus possible to provide the collapsible portable handy phone that is easier to use.

Also, in the embodiment, the ring member 10 and the bearing member 7 of the rotary shaft 5 are made of suitable synthetic resin. Accordingly, it is possible to provide the handy portable phone that is superior in mass-productivity in low cost and in addition to more effectively attain the miniaturization and reduction in weight of the portable phone as a whole.

With such an arrangement according to the present invention, it is possible to hold the opened condition without fail when the display member is opened to the operating member, and it is possible to hold the closed condition without fail when the display member is closed to the operating member. It is therefore possible to provide the handy phone that is easy and convenient to use. In addition, due to its structural characteristics, it is possible to exhibit the good rotational biasing force without fail even with the miniaturized size. It is therefore possible to provide the miniaturization and reduction in weight of the portable handy phone as a whole. Thus, it is possible to provide the hinge structure for the collapsible handy phone that is novel and much superior in marketability.

Also, according to a second aspect of the present invention, in addition to the advantage of the first aspect, the biasing member for biasing the bearing member to the rotational shaft is provided, so that the depression biasing force of this biasing member causes the damping effect to the above-described operating member due to the contact resistance between the rotary shaft and the bearing member when the display member is rotated between the above-described predetermined rotational positions to thereby serve it as the holding force for holding the display member to the operating member in the opened condition. Accordingly, it goes without saying that it is easy to simplify the structure in low cost with a high mass-productivity. In addition, it is possible to provide the hinge structure for the collapsible handy phone that is novel and much superior in marketability. For example, it is possible to provide the collapsible portable phone that is much easier to use.

Also, according to a third aspect of the present invention, in addition to the advantages of the first and second aspects, the bearing member in the rotational shaft and the engagement portion engaging the bearing member are made of suitable synthetic resin. Accordingly, it goes without saying that it is easy to simplify the structure in low cost with a high mass-productivity, In addition, it is possible to provide the hinge structure for the collapsible handy phone that is novel and much superior in marketability. For example, it is possible to provide the collapsible portable phone that is much easier to use.

What is claimed is:

1. A hinge structure for a collapsible portable phone, comprising:

an operating member provided with a phone operating portion on its surface;

a display member, pivotally and collapsibly coupled with said operating member and provided with a display image field in which numerals and/or letters for phone numbers and/or names may be displayed on its surface; and a biasing mechanism that exhibits a closing biasing force for biasing said display member in a closing direction between a closed condition that said display member is collapsed to said operating member and a predetermined rotational position where said display member is rotated to said operating member in an opening direction and exhibits an opening biasing force for biasing said display member in the opening direction between a fully opened condition that said display member is fully opened to said operating member and a predetermined rotational position where said display member is rotated in the closing direction, said biasing mechanism being provided at a pivot portion between said operating member and said display member, wherein a rotary shaft coupled with said operating member is provided, a bearing member provided with a recess portion, which is engageable in a convex/concave engagement manner with an elongate projection provided in said rotary shaft, is coupled with said display member, the elongate projection provided on said rotary shaft and the recess portion provided in said bearing member are engageable with each other from a disengaged condition, when said rotary shaft is rotated relative to said bearing member about an axis, so that a rotational biasing force is generated between said rotary shaft and said bearing member for rotating said rotary shaft, said rotational biasing force is set so that the elongate projection provided in said rotary shaft and the recess portion provided in said bearing member are disengaged away from each other so that said rotational biasing force does not work when said display member is being rotated to said operating member between said predetermined rotational positions, and said rotational biasing force is set so that the elongate projection provided on said rotary shaft and the recess portion provided in said bearing member are engageable with each other so that said display member is rotated from the collapsed condition relative to said operating member up to the predetermined rotational position where said display member is rotated in the opening direction and from the opened condition that said display member is fully opened to said operating member to said predetermined rotational position that said display member is rotated in the closing direction to thereby work as the closing biasing force and the opening biasing force, wherein a pair of annular projections define the recess portion, said annular projections formed in a substantially C-shape having a substantially flat end face with rounded end portions, and said elongate projection having a substantially flat end face, and wherein a damping effect is generated by a contact resistance between the end faces of the annular projections and the end face of the elongate projection as the rotary shaft is rotated relative to the bearing member.

2. A hinge structure for a collapsible portable phone, comprising:

an operating member provided with a phone operating portion on its surface;

a display member, pivotally and collapsible coupled with said operating member and provided with a display image field in which numerals and/or letters for phone numbers and/or names may be displayed on its surface; and a biasing mechanism that exhibits a closing biasing force for biasing said display member in a closing direction between a closed condition that said display member is collapsed to said operating member and a predetermined rotational position where said display member is rotated to said operating member in an opening direction and exhibits an opening biasing force for biasing said display member in the opening direction between a fully opened condition that said display member is fully opened to said operating member and a predetermined rotational position where said display member is rotated in the closing direction, said biasing mechanism being provided at a pivot portion between said operating member and said display member, wherein a rotary shaft coupled with said operating member is provided, a bearing member provided with an elongate projections, which is engageable in a convex/concave engagement manner with a recess portion provided in said rotary shaft, is coupled with said display member, the recess portion provided on said rotary shaft and the elongated projection provided in said bearing member are engageable with each other from a disengaged condition, when said rotary shaft is rotated relative to said bearing member about an axis, so that a rotational biasing force is generated between said rotary shaft and said bearing member for rotating said rotary shaft, said rotational biasing force is set so that the recess portion provided in said rotary shaft and the elongate projection provided in said bearing member are disengaged away from each other so that said rotational biasing force does not work when said display member is being rotated to said operating member between said predetermined rotational positions, and said rotational biasing force is set so that the recess portion provided on said rotary shaft and the elongate projection provided in said bearing member are engageable with each other so that said display member is rotated from the collapsed condition relative to said operating member up to the predetermined rotational position where said display member is rotated in the opening direction and from the opened condition that said display member is fully opened to said operating member to said predetermined rotational position that said display member is rotated in the closing direction to thereby work as the closing biasing force and the opening biasing force, wherein a pair of annular projections define the recess portion, said annular projections formed in a substantially C-shape having a substantially flat end face with rounded end portions, and said elongate projection having a substantially flat end face, and wherein a damping effect is generated by a contact resistance between the end faces of the annular projections and the end face of the elongate projection as the rotary shaft is rotated relative to the bearing member.

3. A hinge structure for a collapsible portable phone, comprising:

an operating member provided with a phone operating portion on its surface;

a display member, pivotally and collapsibly coupled with said operating member and provided with a display image field in which numerals and/or letters for phone numbers and/or names may be displayed on its surface; and a biasing mechanism that exhibits a closing biasing force for biasing said display member in a closing direction between a closed condition that said display member is collapsed to said operating member and a predetermined rotational position where said display member is rotated to said operating member in an opening direction and exhibits an opening biasing force for biasing said display member in the opening direction between a fully opened condition that said display member is fully opened to said operating member and a predetermined rotational position where said display member is rotated in the closing direction, said biasing mechanism being provided at a pivot portion between said operating member and said display member, wherein a rotary shaft coupled with said display member is provided, a bearing member provided with a recess portion, which is engageable in a convex/concave engagement manner with an elongate projection provided in said rotary shaft, is coupled with said operating member, the elongate projection provided on said rotary shaft and the recess portion provided in said bearing member are engageable with each other from a disengaged condition, when said rotary shaft is rotated relative to said bearing member about an axis, so that a rotational biasing force is generated between said rotary shaft and said bearing member f or rotating said rotary shaft, said rotational biasing force is set so that the elongate projection provided in said rotary shaft and the recess portion provided in said bearing member are disengaged away from each other so that said rotational biasing force does not work when said display member is being rotated to said operating member between said predetermined rotational positions, and said rotational biasing force is set so that the elongate projection provided on said rotary shaft and the recess portion provided in said bearing member are engageable with each other so that said display member is rotated from the collapsed condition relative to said operating member up to the predetermined rotational position where said display member is rotated in the opening direction and from the opened condition that said display member is fully opened to said operating member to said predetermined rotational position that said display member is rotated in the closing direction to thereby work as the closing biasing force and the opening biasing force, wherein a pair of annular projections define the recess portion, said annular projections formed in a substantially C-shape having a substantially flat end face with rounded end portions, and said elongate projections having a substantially flat end face, and wherein a damping effect is generated by a contact resistance between the end faces of the annular projections and the end face of the elongate projection as the rotary shaft is rotated relative to the bearing member.

4. A hinge structure for a collapsible portable phone, comprising:

an operating member provided with a phone operating portion on its surface;

a display member, pivotally and collapsibly coupled with said operating member and provided with a display image field in which numerals and/or letters for phone numbers and/or names may be displayed on its surface; and a biasing mechanism that exhibits a closing biasing force for biasing said display member in a closing direction between a closed condition that said display member is collapsed to said operating member and a predetermined rotational position where said display member is rotated to said operating member in an opening direction and exhibits an opening biasing force for biasing said display member in the opening direction between a fully opened condition that said display member is fully opened to said operating member and a predetermined rotational position where said display member is rotated in the closing direction, said biasing mechanism being provided at a pivot portion between said operating member and said display member, wherein a rotary shaft coupled with said display member is provided, a bearing member provided with an elongate projection, which is engageable in a convex/concave engagement manner with a recess portion provided in said rotary shaft, is coupled with said operating member, the recess portion provided on said rotary shaft and the elongated projection provided in said bearing member are engageable with each other from a disengaged condition, when said rotary shaft is rotated relative to said bearing member about an axis, so that a rotational biasing force is generated between said rotary shaft and said bearing member for rotating said rotary shaft, said rotational biasing force is set so that the recess portion provided in said rotary shaft and the elongate projection provided in said bearing member are disengaged away front each other so that said rotational biasing force does not work when said display member is being rotated to said operating member between said predetermined rotational positions, and said rotational biasing force is set so that the recess portion provided on said rotary shaft and the elongate projection provided in said bearing member are engageable with each other so that said display member is rotated from the collapsed condition relative to said operating member up to the predetermined rotational position where said display member is rotated in the opening direction and from the opened condition that said display member is fully opened to said operating member to said predetermined rotational position that said display member is rotated in the closing direction to thereby work as the closing biasing force and the opening biasing force, wherein a pair of annular projections define the recess portion, said annular projections formed in a substantially C-shape having a substantially flat end face with rounded end portions, and said elongate projection having a substantially flat end face, and wherein a damping effect is generated by a contact resistance between the end faces of the annular projections and the end face of the elongate projection as the rotary shaft is rotated relative to the bearing member.

5. The hinge structure according to any one of claims 1 to 4, wherein a biasing member for depressing and biasing said bearing member to said rotary shaft is provided, and the depressing and biasing force of said biasing member causes the damping effect due to the contact resistance between said end faces of said annular projection and said elongate projection when said display member is rotated relative to said operating member between said predetermined rotational positions to serve as a holding force for holding the opened condition of said display member to said operating member.

6. The hinge structure according to any one of claims 1 to 4, wherein an engagement portion, that engages with the bearing member in said rotary shaft, and the bearing member are made of suitable synthetic resin.

7. The hinge structure according to claim 5, wherein an engagement portion, that engages with the bearing member in said rotary shaft, and the bearing member are made of suitable synthetic resin.

\* \* \* \* \*

UNITED STATES PATENT AND TRADEMARK OFFICE
CERTIFICATE OF CORRECTION

PATENT NO. : 6,633,643 B1 Page 1 of 1
DATED : October 14, 2003
INVENTOR(S) : Masaaki Ono It is certified that error appears in the above-identified patent and that said Letters Patent is hereby corrected as shown below:

<u>Title page,</u>
Item [57], ABSTRACT, should read:
-- A novel hinge structure for a collapsible portable phone includes an operating member (2) provided with a phone operating portion (1) on its surface; a display member (3), pivotally and collapsibly coupled with the operating member (2) and provided with a display image field (6) in which numerals and/or letters for phone numbers and/or names may be displayed on its surface; and a biasing mechanism (S) that may exhibit a closing biasing force for biasing the display member (3) in a closing direction between a closed condition that the display member (3) is collapsed to the operating member (2) and a predetermined rotational position (A) where the display member (3) is rotated to the operating member (2) in an opening direction and may exhibit an opening biasing force for biasing the display member (3) in the opening direction between a fully opened condition that the display member (3) is fully opened to the operating member (2) and a predetermined rotational position (B) where the display member (3) is rotated in the closing direction. The biasing mechanism (S) is provided at a pivot portion (4) between the operating member (2) and the display member (3). --

Signed and Sealed this

Eighth Day of June, 2004

JON W. DUDAS
*Acting Director of the United States Patent and Trademark Office*